United States Patent
Kuwano

(10) Patent No.: US 8,363,342 B2
(45) Date of Patent: Jan. 29, 2013

(54) PIEZOELECTRIC ACTUATOR, LENS BARREL AND CAMERA

(75) Inventor: Kunihiro Kuwano, Kawasaki (JP)

(73) Assignee: Nikon Corporation, Tokyo (JP)

( * ) Notice: Subject to any disclaimer, the term of this patent is extended or adjusted under 35 U.S.C. 154(b) by 142 days.

(21) Appl. No.: 12/776,753

(22) Filed: May 10, 2010

(65) Prior Publication Data

US 2010/0284098 A1    Nov. 11, 2010

(30) Foreign Application Priority Data

May 11, 2009   (JP) ................................ 2009-114615

(51) Int. Cl.
*G02B 7/02* (2006.01)
(52) U.S. Cl. ...................................................... 359/824
(58) Field of Classification Search .................. 359/824; 310/311, 335
See application file for complete search history.

(56) References Cited

U.S. PATENT DOCUMENTS

| | | | |
|---|---|---|---|
| 4,562,374 A | 12/1985 | Sashida | |
| 6,838,808 B2 | 1/2005 | Tanaka | |

FOREIGN PATENT DOCUMENTS

| | | | |
|---|---|---|---|
| JP | A-58-148682 | | 9/1983 |
| JP | A-2000-324863 | | 11/2000 |
| JP | 2003-243282 | * | 8/2003 |
| JP | A-2003-243282 | | 8/2003 |
| JP | 2005-312192 | * | 11/2005 |
| JP | A-2005-312192 | | 11/2005 |
| JP | 2006-054979 | * | 2/2006 |
| JP | A-2006-054979 | | 2/2006 |
| JP | A-2007-236138 | | 9/2007 |

OTHER PUBLICATIONS

Office Action in Japanese Application No. 2009-114615; dated Oct. 18, 2011 (with English-language translation).

* cited by examiner

*Primary Examiner* — Joseph P Martinez
(74) *Attorney, Agent, or Firm* — Oliff & Berridge, PLC

(57) ABSTRACT

A piezoelectric actuator with low susceptibility to friction and rubbing is provided. A piezoelectric actuator of the present invention is provided with protruding portions, first piezoelectric actuators and second piezoelectric actuators. The protruding portions protrude from a first face of a base member toward a moving member, and are capable of supporting the moving member. The first piezoelectric actuators are provided along members other than the protruding portions and are capable of expanding and contracting in an orthogonal direction that is orthogonal to the first face. The second piezoelectric actuators are provided along the members other than the protruding portions and are capable of expanding and contracting in a direction other than the orthogonal direction.

13 Claims, 10 Drawing Sheets

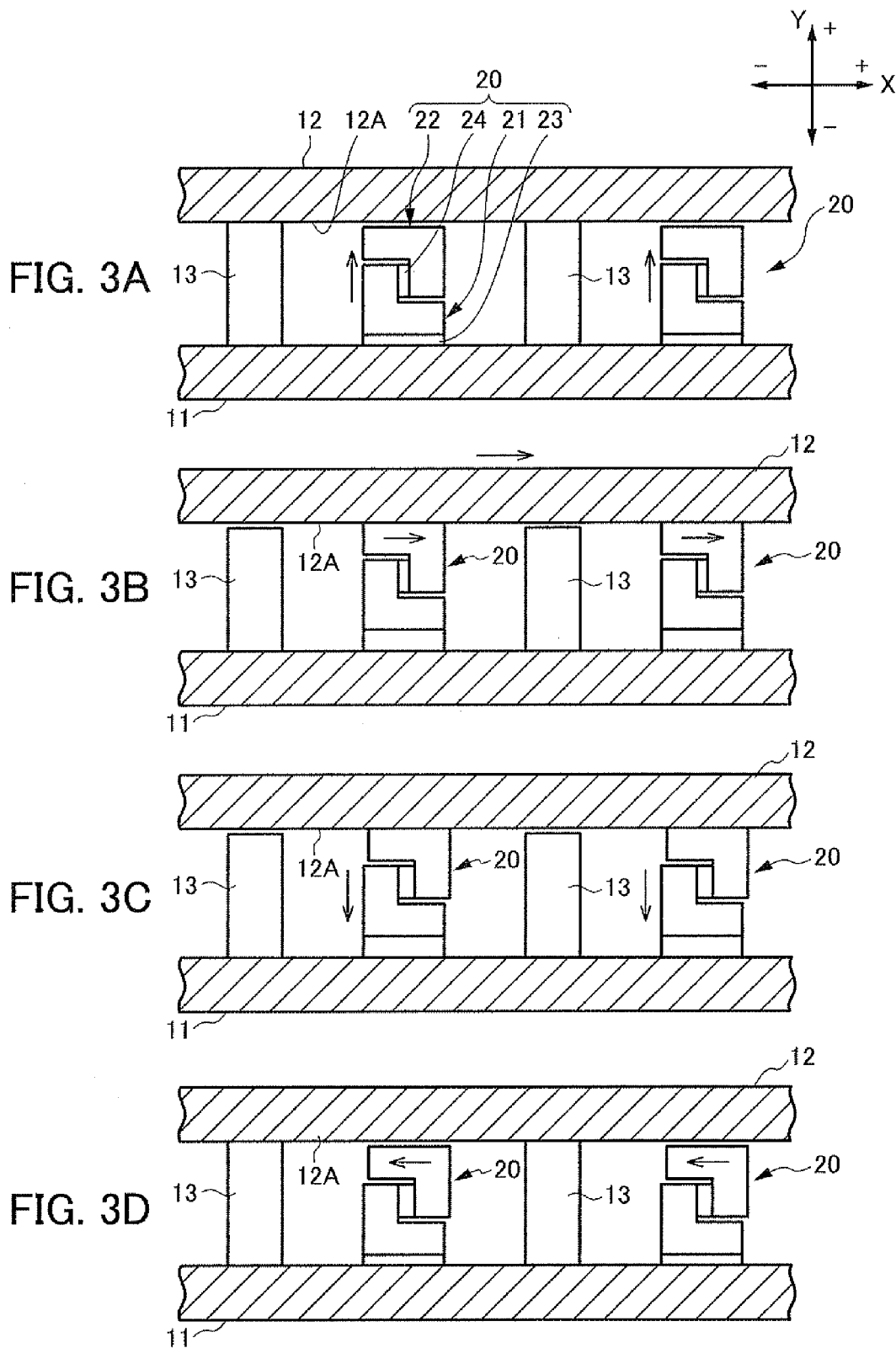

PIEZOELECTRIC ACTUATOR, LENS BARREL AND CAMERA

The present application claims priority under 35 U.S.C. §119 to Japanese Patent Application No. 2009-114615 filed on May 11, 2009. The content of the application is incorporated herein by reference in its entirety.

BACKGROUND OF THE INVENTION

1. Field of the Invention

The present invention relates to a piezoelectric actuator.

2. Description of the Related Art

A piezoelectric actuator causes electromechanical conversion elements to expand and contract with driving signals, and utilizing the expantion and contraction, the piezoelectric actuator generate progressive oscillation waves (hereinafter referred to "progressive wave") at a driving surface of an elastic body. The piezoelectric actuator produces elliptical motions at the driving surface by the progressive waves, makes the relative movement member which pressingly contucts against wave peaks of the elliptical motions move to generate the driving force (see Japanese Patent Application Publication No. S58-148682)

SUMMARY OF THE INVENTION

However, because the related art piezoelectric actuator utilizes elliptical motions, friction and rubbing occur at contact portions, and controlling the speed is complicated.

An object of the present invention is to provide a piezoelectric actuator with low susceptibility to friction and rubbing, and a lens barrel and camera that employ the piezoelectric actuator.

The present invention solves the above problem with the following solution.

According to one aspect of the present invention, there is provided a piezoelectric actuator comprising: a protruding portion that protrudes from a first face of a base member toward a moving member and is capable of supporting the moving member; a first piezoelectric element that is disposed along a member other than the protruding portion and that is capable of expanding and contracting in an orthogonal direction that is orthogonal to the first face; and a second piezoelectric element that is disposed along the member other than the protruding portion and that is capable of expanding and contracting in a direction other than the orthogonal direction.

The first piezoelectric element and the second piezoelectric element may be disposed so as not to touch one another.

The first piezoelectric element may be disposed between the first face and a first member other than the protruding portion, and the second piezoelectric element may be disposed between the first member and a second member other than the first member.

The first member may include a second face that is orthogonal to the first face, the second member may include a third face that is orthogonal to the first face, and the second piezoelectric element may be disposed between the second face and the third face.

The moving member may be placed along a face of the second member at a side that is opposite from the side at which the first face is faced.

The first piezoelectric element may be disposed between a first member other than the protruding portion and a second member other than the first member, and the second piezoelectric element may be disposed between the second member and the protruding portion.

The protruding portion may include a second face that is orthogonal to the first face, the first member may include a third face that is orthogonal to the second face, and the second member may include a fourth face that is orthogonal to the first face and a fifth face that is orthogonal to the second face, the first piezoelectric element may be disposed between the third face and the fifth face, and the second piezoelectric element may be disposed between the second face and the fourth face.

The moving member may be placed along a face of the first member at a side that is opposite from the side at which the first face is disposed.

The piezoelectric actuator may further comprise a control section that performs control to expand and contract the first piezoelectric element and the second piezoelectric element, wherein the control section performs control to move the moving member in a direction of expansion and contraction of the second piezoelectric element by expanding the second piezoelectric element in a state in which the first piezoelectric element is expanded.

In a state in which the first piezoelectric element and the second piezoelectric element are contracted, the moving member may be supported by the protruding portion.

The protruding portion may include a third piezoelectric actuator that is capable of expanding and contracting in the orthogonal direction; and a fourth piezoelectric actuator that is capable of expanding and contracting in a direction other than the orthogonal direction.

The third piezoelectric element and the fourth piezoelectric element may be disposed so as not to touch one another.

The third piezoelectric element may be disposed between the first face and a third member other than the first member and the second member, and the fourth piezoelectric element is disposed between the third member and a fourth member other than the third member.

The third member may include a fourth face that is orthogonal to the first face, the fourth member includes a fifth face that is orthogonal to the first face, and the fourth piezoelectric element is disposed between the fourth face and the fifth face.

The moving member may be placed along a face of the fourth member at a side that is opposite from the side at which the first face is disposed.

The control section may perform control to expand and contract the third piezoelectric element and the fourth piezoelectric element, and performs control to move the moving member in a direction of expansion and contraction of the fourth piezoelectric element by expanding the fourth piezoelectric element in a state in which the third piezoelectric element is expanded.

The moving member may be supported by the second member when the first piezoelectric element is in the expanded state and the third piezoelectric element is in the contracted state, and is supported by the fourth member when the third piezoelectric element is in the expanded state and the first piezoelectric element is in the contracted state.

According to another aspect of the present invention, there is provided a lens barrel provided with a piezoelectric actuator described above.

According to further aspect of the present invention, there is provided a camera provided with a piezoelectric actuator described above.

These constitutions may be suitably modified, and at least portions thereof may be substituted with other constituents.

According to the present invention, a piezoelectric actuator with low susceptibility to occurrences of friction and rubbing may be provided.

BRIEF DESCRIPTION OF THE DRAWINGS

FIG. 2A shows an example of driving a moving member in a +X direction, and FIG. 2B shows an example of driving the moving member in the –X direction;

FIG. 3A to FIG. 3D are diagrams describing an operation of the piezoelectric actuator of the first embodiment step by step;

DETAILED DESCRIPTION OF THE INVENTION

First Embodiment

Herebelow, a first preferred embodiment of the present invention is described with reference to the attached drawings and suchlike.

Figure 1:
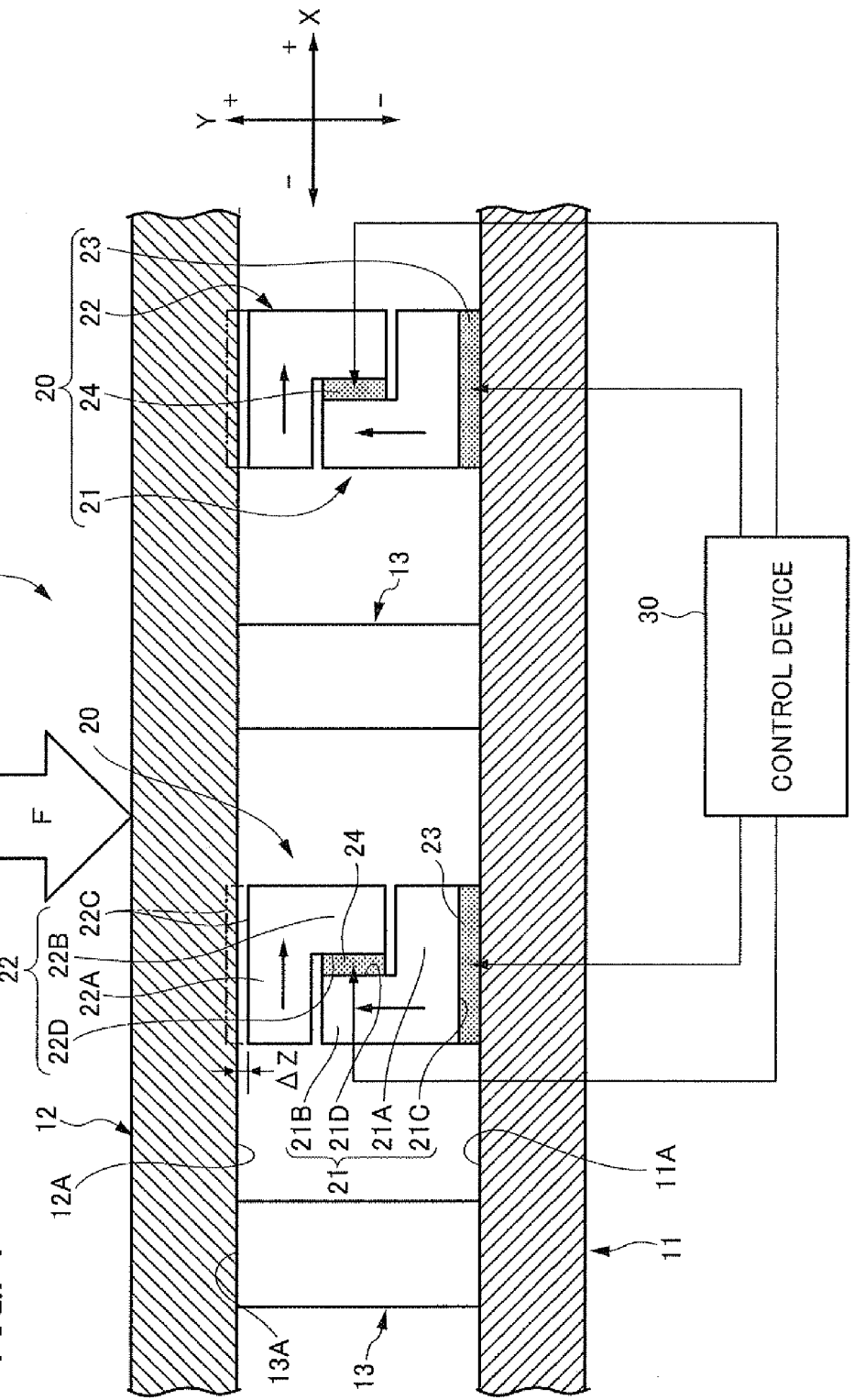
FIG. 1 is a diagram schematically illustrating the structure of a piezoelectric actuator that is a first embodiment of the present invention.

FIG. 1 is a diagram schematically illustrating the structure of a piezoelectric actuator 10 that is the first embodiment of the present invention. In the descriptions hereinafter, directions are indicated by X-Y coordinates as shown in the drawings. That is, the left-right direction in the drawings is the X axis direction, with the right side being the positive side and the left side being the negative side, and the vertical direction orthogonal to the X direction is the Y axis direction, with the upper side being the positive side and the lower side being the negative side.

The piezoelectric actuator 10 is provided with a base member 11, a moving member 12 that is movable relative to the base member 11, driving mechanisms 20 that drive to move the moving member 12, and a control device 30 that controls driving of the piezoelectric actuator 10. In the present embodiment, the moving member 12 is described as moving linearly in the X direction relative to the base member 11, but movements of the moving member 12 are not to be limited to straight lines and may be, for example, circular arcs (rotations).

The base member 11 and the moving member 12 are formed as plates with respective predetermined thicknesses, and are disposed with plate faces thereof along the X direction. Holding bodies 13 are interposed between the base member 11 and the moving member 12. The moving member 12 is pushingly urged by a predetermined force F toward the base member 11 (in the –Y direction) by unillustrated urging means. Thus, the base member 11 and the moving member 12 are disposed to be parallel with a spacing defined by the holding bodies 13. The structure in the present embodiment is provided with the urging means, but this is not to be limiting. The moving member 12 may be urged toward the base member 11 (in the –Y direction) by gravity.

The above-mentioned holding bodies 13, which support the moving member 12, are provided at the base member 11, standing from an upper face thereof that opposes the moving member 12 (an opposing face 11A). At the opposing face 11A, a plural number of the driving mechanisms 20 are disposed with a predetermined spacing in the X direction.

The holding bodies 13 are respectively disposed between the driving mechanisms 20 disposed with the predetermined spacing in the X direction. The shapes of the holding bodies 13 are rectangles with a predetermined height. Upper faces of the holding bodies 13 serve as flat support surfaces 13A that correspond with a driven surface 12A of the moving member 12, which is described hereafter. Thus, the holding bodies 13 support the moving member 12 that is pushingly urged by the urging means with the support surfaces 13A, and define the spacing between the base member 11 and the moving member 12. Note that shapes and positions of arrangement of the holding bodies 13 are not to be limited by this constitution.

As described above, the moving member 12 is disposed to be parallel with the base member 11 at the upper side (the +Y side) thereof, with the spacing defined by the holding bodies 13. The face of the moving member 12 at the side that opposes the base member 11 (the lower face) is the driven surface 12A, which is flat.

As described above, the driving mechanisms 20 are plurally provided at the opposing face 11A of the base member 11 with a predetermined spacing in the X direction. Each driving mechanism 20 is provided with a lifter 21 and a slider 22. The driving mechanism 20 is further provided with a lift driving body 23, which is interposed between the lifter 21 and the base member 11, and a slide driving body 24, which is interposed between the lifter 21 and the slider 22.

The lifter 21 is provided with a base plate portion 21A and a support portion 213. The base plate portion 21A extends in the X direction. The support portion 21B protrudes to a predetermined length upward (in the +Y direction) from an end portion of the base plate portion 21A at the left side thereof in FIG. 1. Thus, a front face shape of the lifter 21 illustrated in FIG. 1 is formed in a substantial L shape.

The front face shape of the slider 22 illustrated in FIG. 1 is formed in a substantial L shape that is inverted to match up with the lifter 21. That is, a top plate portion 22A extends in the X direction, and a support portion 22B protrudes to a predetermined length downward (in the –Y direction) from an end portion of the top plate portion 22A at the right side thereof in FIG. 1. A surface at the upper side of the top plate portion 22A serves as a flat driving surface 22C that corresponds with the driven surface 12A of the moving member 12.

The lift driving body 23 and the slide driving body 24 are both piezoelectric elements with predetermined thicknesses that are constituted of a piezoelectric ceramic that exhibits the piezoelectric effect, or the like. The lift driving body 23 and the slide driving body 24 are each deformed by a predetermined amount in one direction (the thickness direction) by the application of a voltage. That is, the lift driving body 23 and the slide driving body 24 expand and contract in the predetermined directions by the voltages being turned on and off (expanding when the voltage is on and contracting when the voltage is off), and thus implement operation driving. Voltages are applied to the lift driving body 23 and the slide driving body 24 from respective driving circuits provided at the control device 30. Thus, driving control is performed by the control device 30.

The lift driving body 23 is interposed between a bottom face 21C of the lifter 21 and the upper face (the opposing face 11A) of the base member 11. The lift driving body 23 is provided with the direction of deformation (operation driving direction) thereof being the Y direction. Thus, the lift driving body 23 expands and contracts in the Y direction in accordance with control by the control device 30, and the lifter 21 is operated to move with a predetermined stroke length in the Y direction relative to the base member 11.

The slide driving body 24 is interposed between a side face of the support portion 21B of the lifter 21 at the right side thereof in FIG. 1 (a connecting side face 21D) and a side face of the support portion 22B of the slider 22 at the left side thereof in FIG. 1 (a connecting side face 22D). The connecting side face 21D of the lifter 21 and the connecting side face 22D of the slider 22 are formed to be orthogonal to the opposing face 11A of the base member 11. The slide driving body 24 is provided with the direction of deformation (operation driving direction) thereof by the application of voltage being the X direction. Thus, the slide driving body 24 expands and contracts in the X direction in accordance with control by the control device 30, and the slider 22 is operated to move with a predetermined stroke length in the X direction relative to the lifter 21.

As described above, in the driving mechanism 20, the lifter 21 is operated to move with a predetermined stroke length in the Y direction relative to the base member 11 by driving of the lift driving body 23, and the slider 22 is operated to move with a predetermined stroke length in the X direction relative to the lifter 21 by driving of the slide driving body 24.

The movement stroke length of the slider 22 in the Y direction relative to the base member 11, by driving with the lift driving body 23, is set as follows. As illustrated in FIG. 1, when the lift driving bodies 23 are in a non-operating state, the lifters 21 are disposed at the lower end of the movement stroke, and the upper faces of the sliders 22 (the driving surfaces 22C) have a predetermined spacing ($\Delta z$) from the lower face of the moving member 12 (the driven surface 12A), which is supported by the holding bodies 13. When the lifters 21 are operated to rise by the driving of the lift driving bodies 23 and are disposed at the upper end of the movement stroke, the driving surfaces 22C of the sliders 22 are a predetermined distance to the upper side relative to the driven surface 12A of the moving member 12 as supported by the holding bodies 13, as shown by the two-dot chain lines in FIG. 1.

With this setting, in accordance with the driving of the lift driving bodies 23, the driving mechanisms 20 (i.e., the lifters 21 via the sliders 22) lift up and support the moving member 12 that was supported by the holding bodies 13. From this state, when the slide driving bodies 24 are driven and the sliders 22 are operated to move in the X direction relative to the lifters 21, the moving member 12 being held by the sliders 22 moves in the X direction relative to the base member 11.

In the piezoelectric actuator 10 that is provided with the driving mechanism 20 constituted as described above, voltages applied to the lift driving bodies 23 and the slide driving bodies 24 of the driving mechanisms 20 are respectively controlled by the control device 30, and drive to move the moving member 12 continuously. In the present embodiment, the plural driving mechanisms 20 provided at the base member 11 are all operated cyclically by the same control.

Figure 2A:
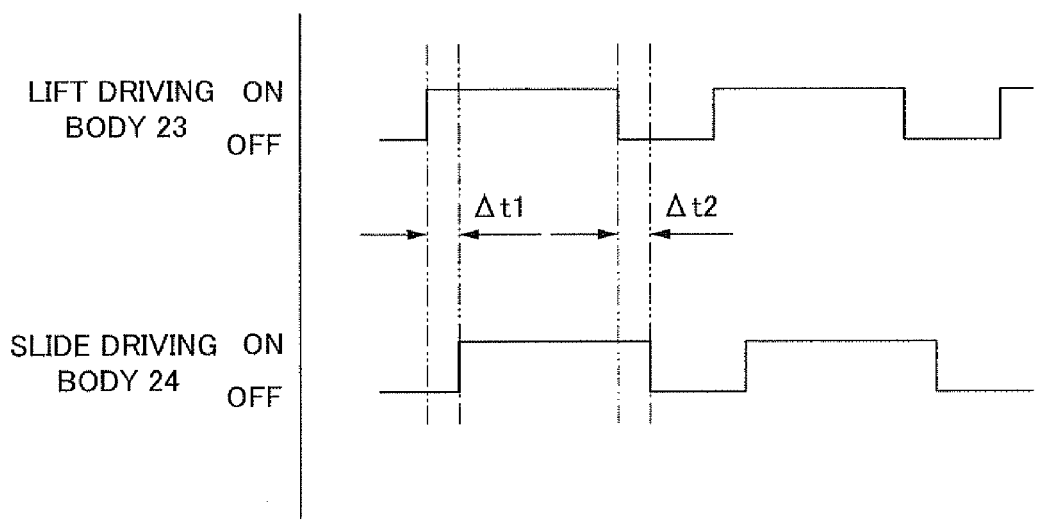
FIG. 2A and FIG. 2B are timing charts describing operations of the piezoelectric actuator of the first embodiment.
Figure 2B:
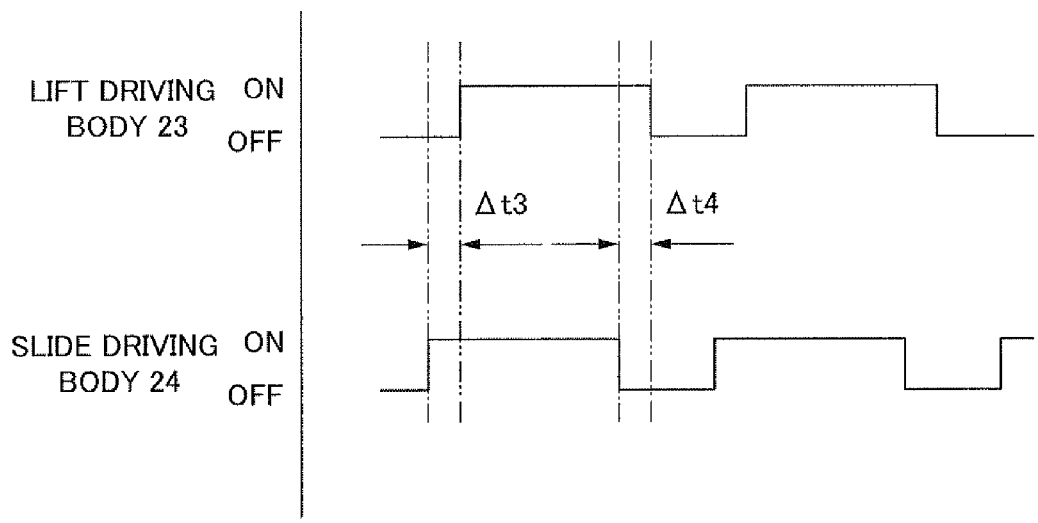

Next, control by the control device 30 that continuously drives to move the moving member 12 is described with reference to FIG. 2A and FIG. 2B and FIG. 3A to FIG. 3D as well as FIG. 1. FIG. 2A and FIG. 2B are timing charts describing operations of the piezoelectric actuator 10. FIG. 2A shows an example of driving the moving member in the +X direction, and FIG. 2B shows an example of driving the moving member in the −X direction. FIG. 3A to FIG. 3D are diagrams describing an operation of the piezoelectric actuator of the first embodiment step by step, which is an example in which the moving member 12 is driven in the +X direction.

First, from the non-operating state shown in FIG. 3A (the same state as in FIG. 1), the lift driving bodies 23 are driven (turned on). As a result, as shown in FIG. 3B, the moving member 12 supported by the holding bodies 13 is supported by the driving mechanisms 20 (i.e., the sliders 22). After a predetermined duration ($\Delta t1$) of the driving of the lift driving bodies 23, the slide driving bodies 24 are driven (turned on). Therefore, as shown in FIG. 3C, the sliders 22 are operated to move in the +X direction. As a result, the moving member 12 supported by the sliders 22 is moved in the +X direction by an amount corresponding to the movement stroke of the sliders 22 by the slide driving bodies 24.

Then, the driving of the lift driving bodies 23 is stopped (turned off). Therefore, as shown in FIG. 3D, the support of the moving member 12 by the driving mechanisms 20 (the sliders 22) is removed, and the moving member 12 is supported by the holding bodies 13. Then, a predetermined duration ($\Delta t2$) after the driving of the lift driving bodies 23 has stopped (been turned off), the driving of the slide driving bodies 24 is stopped (turned off). Thus, the piezoelectric actuator 10 returns to the non-operating state shown in FIG. 3A. When the sliders 22 are returning to the non-operating state, the sliders 22 are not supporting the moving member 12 and do not operate to move the moving member 12. Hence, by rapidly repeating the steps described above, the moving member 12 may be driven to move smoothly in the +X direction.

The above-described steps are an example in which the moving member 12 is driven in the +X direction. The moving member 12 may be driven in the −X direction by the driving mechanisms 20 being driven as in the timing chart shown in FIG. 2B. That is, from the non-operating state shown in FIG. 1, the slide driving bodies 24 are driven (turned on) and, a predetermined duration ($\Delta t3$) later, the lift driving bodies 23 are driven (turned on). As a result, the moving member 12 is supported by the driving mechanisms 20 (the sliders 22).

Then, the driving of the slide driving bodies 24 is stopped (turned off). Therefore, the sliders 22 are operated to move in the −X direction, and the moving member 12 is moved in the −X direction by the amount corresponding to the movement stroke of the sliders 22 by the slide driving bodies 24.

A predetermined duration ($\Delta t4$) after the driving of the slide driving bodies 24 has stopped (been turned off), the driving of the lift driving bodies 23 is stopped (turned off), and the holding of the moving member 12 by the driving mechanisms 20 (the sliders 22) is removed. Therefore, the moving member 12 is supported by the holding bodies 13 and the piezoelectric actuator 10 returns to the non-operating state shown in FIG. 1.

By rapid repetition of the steps described above, the moving member 12 may be driven to move in the −X direction.

According to the present embodiment, the following effects are provided.

(1) In the structure of the present embodiment, the moving member 12 is supported by the driving of the lift driving bodies 23, and the supported moving member 12 is operated to move by the driving of the slide driving bodies 24. That is, the respective directions of action of the lift driving bodies 23 and the slide driving bodies 24 match directions in which the moving member 12 is operated, and the two actions are performed independently. Velocities (speeds and directions) of forces relating to the respective operations are constant and there are no unnecessary relative displacements (scraping) due to variations in speed between the driving mechanisms 20 (the sliders 22) and the moving member 12. Therefore, abrasion caused by scraping may be suppressed.

(2) The lift driving bodies 23 implement support of the moving member 12 and the slide driving bodies 24 implement movement operations of the moving member 12. Because the lift driving body 23 and the slide driving body 24 do not touch one another, the effect of vibrations when one of the driving bodies is driven on the other driving body is extremely small. That is, support and movement driving of the moving member 12 are completely separate, and driving control thereof may be independent. Therefore, there is great freedom of control, and the piezoelectric actuator 10 may be constituted for high driving precision.

Second Embodiment

Figure 4:
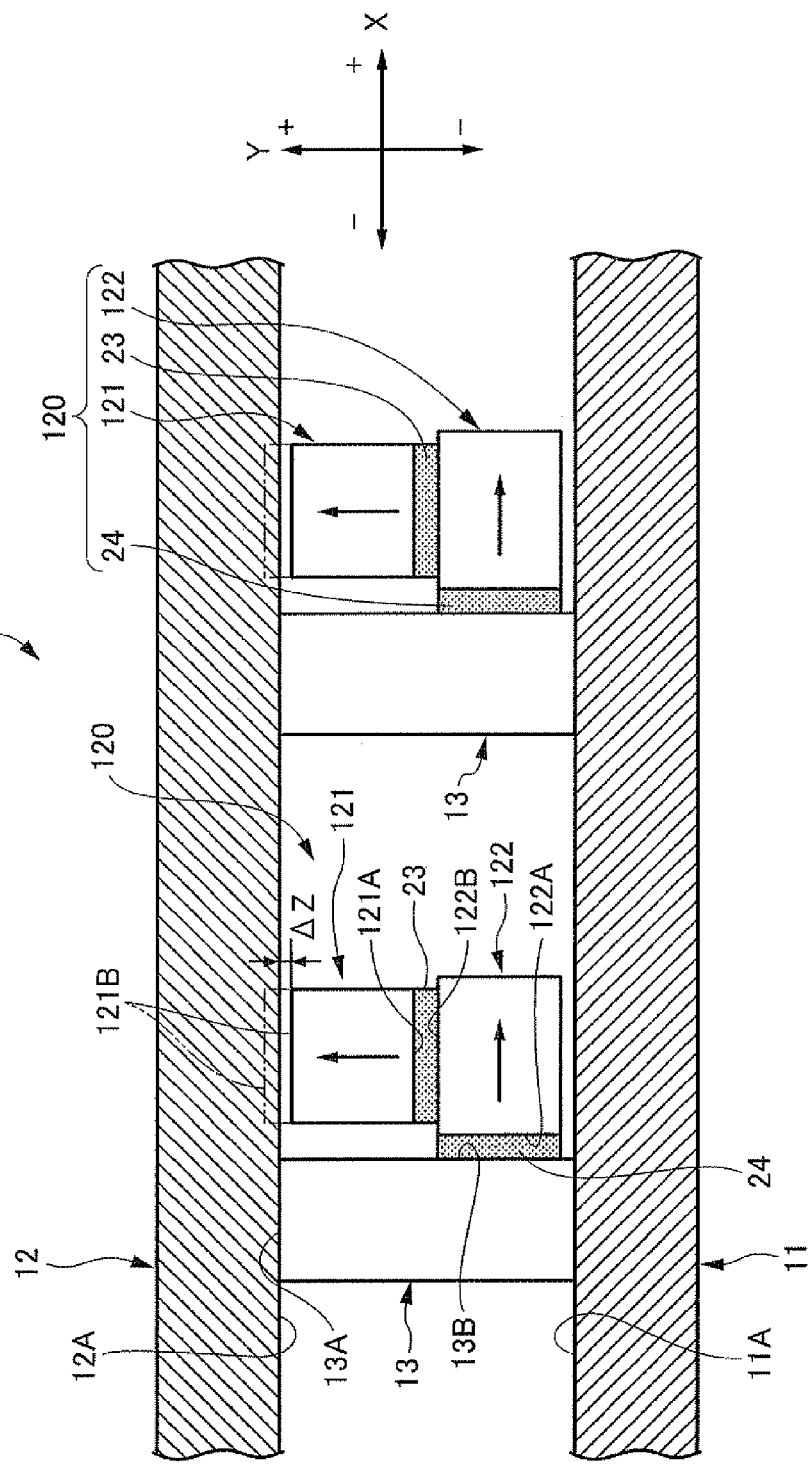
FIG. 4 is a diagram schematically illustrating the structure of a piezoelectric actuator that is a second embodiment of the present invention.

Next, a second embodiment with a different structure from the above-described first embodiment is described. FIG. 4 is a diagram schematically illustrating the structure of a piezoelectric actuator 100 of the second embodiment of the present invention. In FIG. 4, structural elements with the same functions as in the above-described first embodiment are assigned the same reference numerals, and descriptions thereof are not given.

The piezoelectric actuator 100 differs from the piezoelectric actuator 10 of the above-described first embodiment (see FIG. 1) in the structure of a driving mechanism 120. That is, the driving mechanism 120 is provided with a lifter 121 and a slider 122. The driving mechanism 120 is also provided with the lift driving body 23, which drives the lifter 121, and the slide driving body 24, which drives the slider 122.

In the present second embodiment, the slider 122 is provided at the upper face of the base member 11 (the opposing face 11A) to be movable in the X direction along the opposing face 11A. The slider 122 is disposed adjacent to the holding body 13, and is connected to the holding body 13 via the slide driving body 24. That is, the slide driving body 24 is interposed between a connecting face 13B formed at the holding body 13 and a connecting side face 122A formed at the slider 122. The connecting face 13B of the holding body 13 and the connecting side face 122A of the slider 122 are formed to be orthogonal to the opposing face 11A of the base member 11.

The lifter 121 is provided at the upper face of the slider 122, with the lift driving body 23 therebetween. That is, the lift driving body 23 is interposed between an upper face of the slider 122 (a connecting top face 122B) and a bottom face of the lifter 121 (a connecting bottom face 121A). The connecting top face 122B of the slider 122 and the connecting bottom face 121A of the lifter 121 are both formed to be parallel with the opposing face 11A of the base member 11.

According to this constitution, the slider 122 and the lifter 121 (i.e., the driving mechanism 120) are operated to move in the X direction by the driving of the slide driving body 24. Further, the lifter 121 is operated to move in the Y direction (operated to rise and fall) relative to the slider 122 by the driving of the lift driving body 23.

The movement stroke length of the lifter 121 in the Y direction by the driving of the lift driving body 23 is set as follows. As illustrated in FIG. 4, when the lift driving body 23 is in the non-operating state, the lifter 121 is disposed at the lower end of the movement stroke, and an upper face of the lifter 121 (a driving surface 121B) has a predetermined spacing (Δz) from the lower face of the moving member 12 (the driven surface 12A), which is supported by the holding bodies 13. When the lifters 121 are operated to rise by the driving of the lift driving bodies 23 and are disposed at the upper end of the movement stroke, the driving surfaces 121B are a predetermined distance to the upper side relative to the driven surface 12A of the moving member 12 as supported by the holding bodies 13, as shown by the two-dot chain lines in FIG. 4.

With this setting, in accordance with the driving of the lift driving bodies 23, the driving mechanisms 120 (i.e., the lifters 121) lift up and support the moving member 12 that was supported by the holding bodies 13. From this state, when the slide driving bodies 24 are driven and the sliders 122 are operated to move in the X direction relative to the holding bodies 13, the moving member 12 held by the sliders 122 moves in the X direction relative to the base member 11.

The piezoelectric actuator 100 that is provided with the driving mechanisms 120 structured as described above may continuously drive the moving member 12 to move in the X direction by controlling driving of the lift driving bodies 23 and the slide driving bodies 24. This control may be the same as in the above-described first embodiment, and is not described.

According to the present second embodiment, similarly to the above-described first embodiment, scraping and abrasion caused by scraping may be suppressed. Furthermore, because support and movement driving of the moving member 12 are completely separate and driving control thereof may be independent, there is great freedom of control, and the piezoelectric actuator 100 may be constituted for high driving precision.

Third Embodiment

Figure 5:
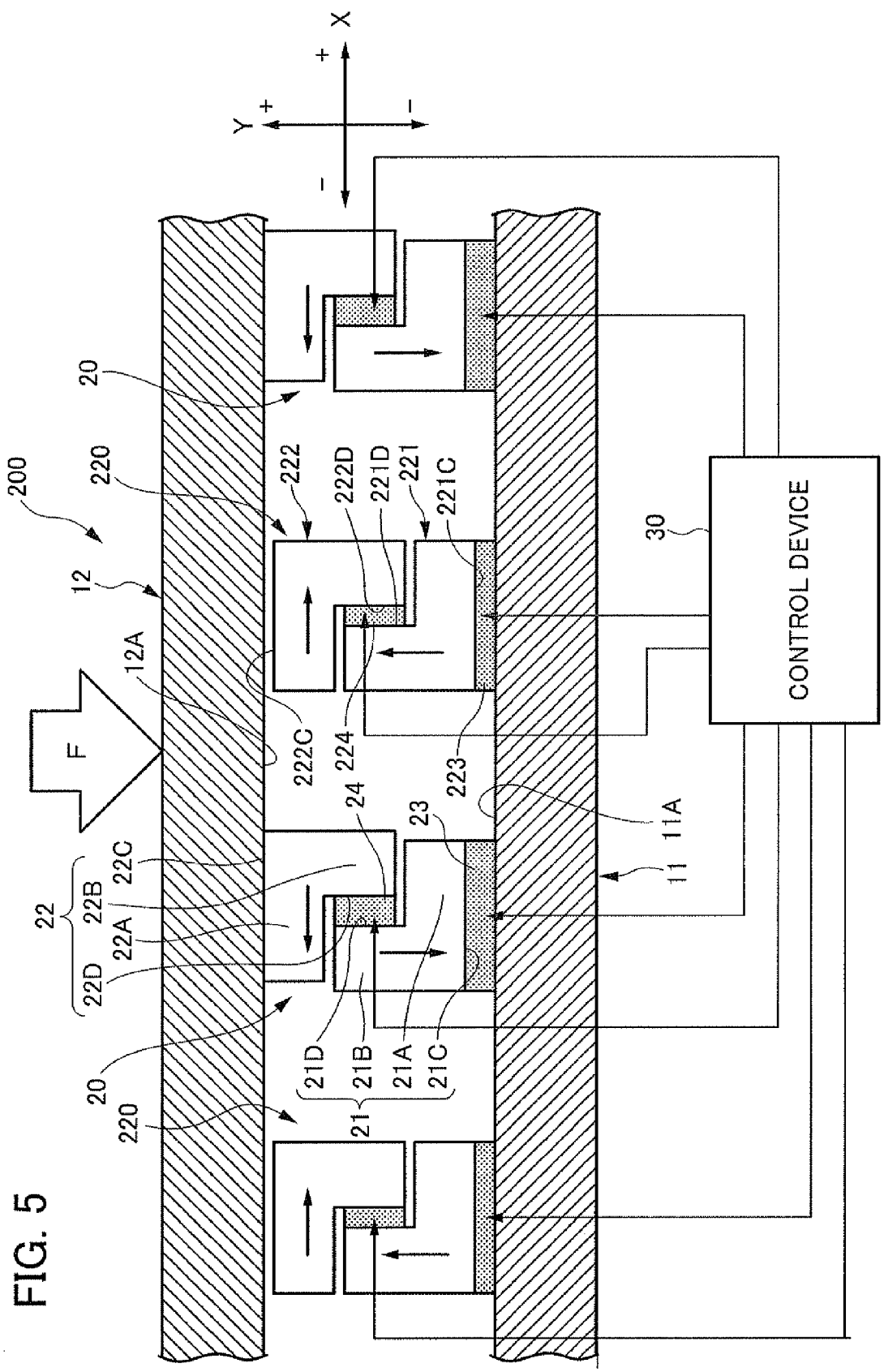
FIG. 5 is a diagram schematically illustrating the structure of a piezoelectric actuator that is a third embodiment of the present invention.

Next, a third embodiment is described. FIG. 5 is a diagram schematically illustrating the structure of a piezoelectric actuator 200 of the third embodiment of the present invention. In FIG. 5, structural elements with the same functions as in the above-described first embodiment are assigned the same reference numerals, and descriptions thereof are not given.

Similarly to the piezoelectric actuator 10 of the above-described first embodiment (see FIG. 1), the piezoelectric actuator 200 illustrated in FIG. 5 is provided with a plural number of the driving mechanisms 20. In the present embodiment, however, the holding bodies 13 of the first embodiment (see FIG. 1) are not provided. Instead, second driving mechanisms 220 are provided.

That is, the driving mechanisms 20 and the second driving mechanisms 220 are disposed between the base member 11 and the moving member 12. The driving mechanisms 20 and the second driving mechanisms 220 are provided alternately on the opposing face 11A of the base member 11 with a predetermined spacing in the X direction.

The driving mechanisms 20 have the same structure as the driving mechanisms 20 of the piezoelectric actuator 10 of the above-described first embodiment (see FIG. 1), and descriptions thereof are not given. The second driving mechanisms 220 have the same structure as the driving mechanisms 20 but different reference numerals are assigned to the structural elements.

That is, each second driving mechanism 220 is provided with a lifter 221, a slider 222, a lift driving body 223 and a slide driving body 224.

The lift driving body 223 is interposed between the bottom face of the lifter 221 (a connecting bottom face 221C) and the top face of the base member 11 (the opposing face 11A), and connects the base member 11 with the lifter 221. The slide driving body 224 is interposed between a connecting side face 2210 of the lifter 221 and a connecting side face 222D of the slider 222, and connects the lifter 221 with the slider 222.

In the second driving mechanism 220, the lifter 221 is operated to move with a predetermined stroke length in the Y direction relative to the base plate portion by driving of the lift driving body 223, and the slider 222 is operated to move with a predetermined stroke length in the X direction relative to the lifter 221 by driving of the slide driving body 224. The slider 222 rises and falls in association with movements of the lifter 221 in the Y direction (rises and falls) caused by the driving of the lift driving body 223. The movement stroke length of the slider 222 in the Y direction relative to the base member 11 due to the driving of the lift driving body 223 is set equal to that of the driving mechanism 20.

Similarly to the driving mechanisms 20, the second driving mechanisms 220 that are structured thus are controlled by the control device 30. That is, in accordance with the driving of the lift driving bodies 223, the lifters 221, via the sliders 222, lift up and support the moving member 12 that was supported by the holding bodies 13. Then, in the state in which the moving member 12 is supported, when the slide driving bodies 224 are driven and the sliders 222 are operated to move in the X direction relative to the lifters 221, the moving member 12 being held by the sliders 222 moves in the X direction relative to the base member 11.

As mentioned above, the driving mechanisms 20 and the second driving mechanisms 220 have the same structures, but timings of driving control thereof are different. The driving mechanisms 20 and the second driving mechanisms 220 mutually alternately implement holding and movement operation of the moving member 12 and release holding of the moving member 12, and thus operate to move the moving member 12 in the X direction relative to the base member 11.

Figure 6:
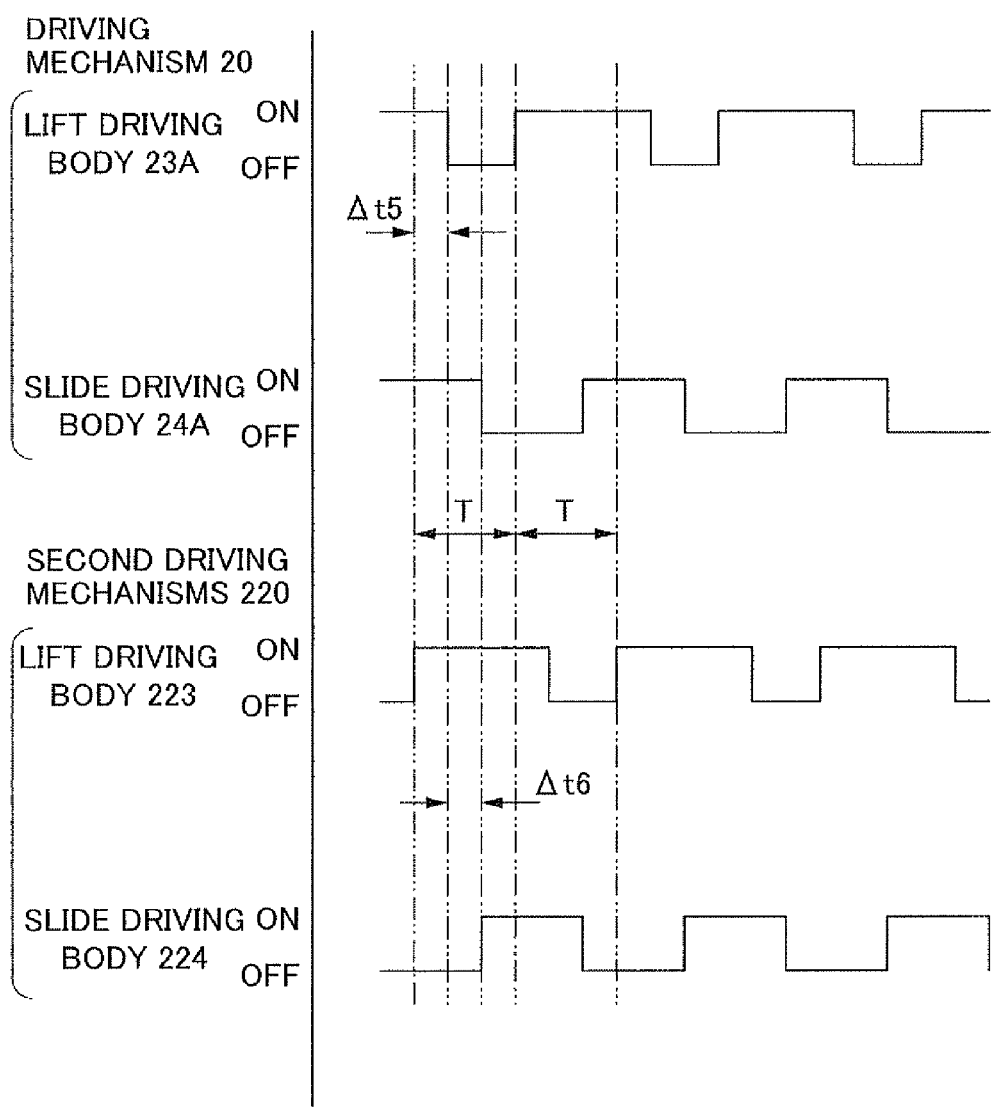
FIG. 6 is a timing chart describing operation of the piezoelectric actuator of the third embodiment.

Next, driving control of the driving mechanisms 20 and the second driving mechanisms 220 for movement operation of the moving member 12 is described with reference to FIG. 6 and FIG. 7A to FIG. 7D as well as the above-described FIG. 5. FIG. 6 is a timing chart describing operation of the piezoelectric actuator 200, and illustrates an example of driving the moving member 12 in the +X direction. FIG. 7A to FIG. 7D are diagrams describing the operation of the piezoelectric actuator 200 step by step, which is the example in which the moving member 12 is driven in the +X direction.

Basic operations of the driving mechanisms 20 and the second driving mechanisms 220 are the same as in the above-described first embodiment. That is, the lift driving bodies 23 or 223 are driven (turned on) and support the moving member 12 with the sliders 22 or 222. Then the slide driving bodies 24 or 224 are driven (turned on) and the moving member 12 held by the sliders 22 or 222 moves in the +X direction. Thereafter, the driving of the lift driving bodies 23 or 223 stops (is turned off) and the holding of the moving member 12 by the sliders 22 or 222 is released, and the driving of the slide driving bodies 24 or 224 stops (is turned off) and the piezoelectric actuator 200 returns to the state before driving.

By offsetting driving control by a predetermined duration T between the driving mechanisms 20 and the second driving mechanisms 220, it is possible to drive the moving member 12 while supporting the moving member 12.

Herebelow, control of the driving mechanisms 20 and the second driving mechanisms 220 is described in more detail. In the non-operating state shown in FIG. 7A (the same state as in FIG. 5), the driving mechanisms 20 (the lift driving bodies 23 and the slide driving bodies 24) are in a driving state and the second driving mechanisms 220 (the lift driving bodies 223 and the slide driving bodies 224) are in a non-driving state. In this initial state, the driving mechanisms 20 are supporting the moving member 12.

From this initial state, the lift driving bodies 223 of the second driving mechanisms 220 are driven. Hence, as shown in FIG. 7B, both the driving mechanisms 20 and the second driving mechanisms 220 support the moving member 12.

After a predetermined duration ($\Delta t5$) of the driving of the lift driving bodies 223 of the second driving mechanisms 220, the driving of the lift driving bodies 23 of the driving mechanisms 20 stops (is turned off) and the support of the moving member 12 by the driving mechanisms 20 is removed. Hence, as shown in FIG. 7C, the piezoelectric actuator 200 is in a state in which only the second driving mechanisms 220 are supporting the moving member 12. That is, the second driving mechanisms 220 have replaced the driving mechanisms 20 in supporting the moving member 12.

Then, a predetermined duration ($\Delta t6$) after the driving of the lift driving bodies 23 of the driving mechanisms 20 has stopped, the slide driving bodies 224 of the second driving mechanisms 220 are driven (turned on). Thus, the moving member 12 supported by the second driving mechanisms 220 moves in the +X direction. At the same time, the driving of the lift driving bodies 23 of the driving mechanisms 20 stops (is turned off). Thus, the piezoelectric actuator 200 goes into the state shown in FIG. 7D.

Figure 7:
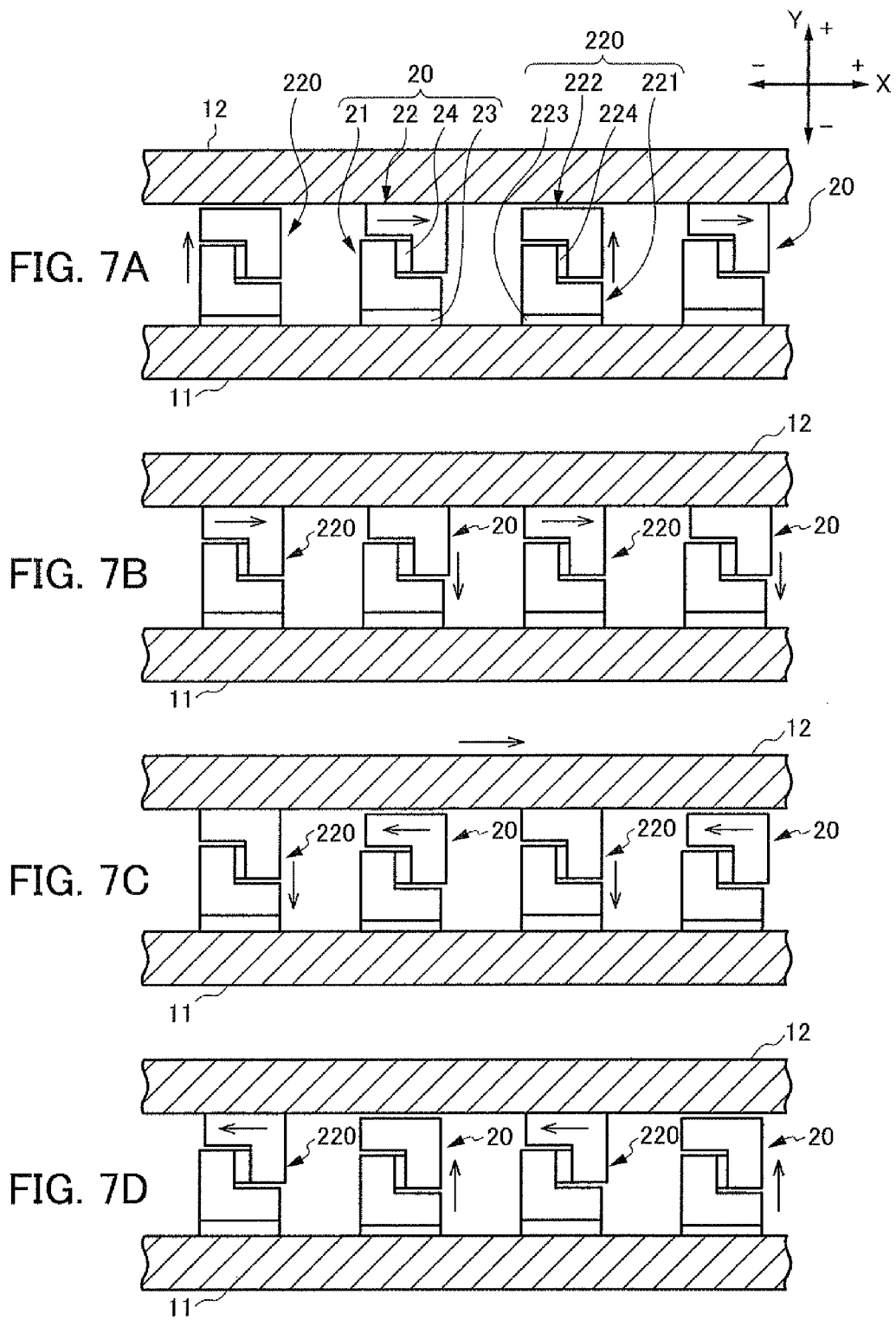
FIG. 7A to FIG. 7D are diagrams describing the operation of the piezoelectric actuator of the third embodiment step by step.

In the state shown in FIG. 7D, the second driving mechanisms 220 (the lift driving bodies 223 and the slide driving bodies 224) are in the driving state and are supporting the moving member 12. Meanwhile, the driving mechanisms 20 (the lift driving bodies 23 and the slide driving bodies 24) are in the non-driving state. In other words, the state shown in FIG. 7D is a state in which the operational states of the driving mechanisms 20 and the second driving mechanisms 220 are exchanged from the state shown in FIG. 7A.

Thereafter, control is performed to carry out the above-described steps with references to the driving mechanisms 20 and the second driving mechanisms 220 being switched. That is, the moving member 12 is supported by the driving mechanisms 20, the support of the moving member 12 by the second driving mechanisms 220 is removed, and the moving member 12 is driven to move by the driving mechanisms 20. The above-described process is repeated, and thus the moving member 12 may be driven to move smoothly in the +X direction.

That is, as is illustrated in FIG. 6, the moving member 12 may be driven to move in the +X direction by the second driving mechanisms 220 performing exactly the same operations as the operations of the driving mechanisms 20, offset by the predetermined duration T. It is sufficient if the time differential (T) between the driving mechanisms 20 and the second driving mechanisms 220 is at least a duration from the moving member 12 being supported to the feeding driving ending.

In the present embodiment too, similarly to the above-described first embodiment, the moving member 12 may be driven to move in the −X direction. In this case, it is sufficient to reverse the control for turning on and off the lift driving bodies 23 of the driving mechanisms 20 and the lift driving bodies 223 of the second driving mechanisms 220 in each of the above-described steps, detailed descriptions are not given.

In the above descriptions, the third embodiment is described as being provided with the second driving mechanisms 220 with the same structure as the driving mechanisms 20 instead of the holding bodies 13 of the above-described first embodiment, and as implementing different control for the driving mechanisms 20 and the second driving mechanisms 220. However, taking a different point of view, the third embodiment may be described as having a plural number of the driving mechanism 20 arranged with the predetermined spacing in the X direction and alternatingly grouped, with the moving member 12 being controlled to move in the X direction relative to the base member 11 by different control being implemented for the groups.

According to the above-described third embodiment, the following effects are provided. Specifically, similarly to the above-described first embodiment, scraping and abrasion caused by scraping may be suppressed. Furthermore, because support and movement driving of the moving member 12 are completely separate and driving control thereof may be independent, there is great freedom of control, and the piezoelectric actuator 200 may be constituted for high driving precision.

In addition, because the moving member 12 is supported and operated to move at the same height (a Y direction position) by the driving mechanisms 20 and the second driving mechanisms 220, the moving member 12 does not move in the vertical direction (the Y direction). Therefore, smooth operation is possible.

The embodiments described above are not limiting, numerous modifications and alterations are possible and are to fall within the scope of equivalents of the present invention.

Figure 8:
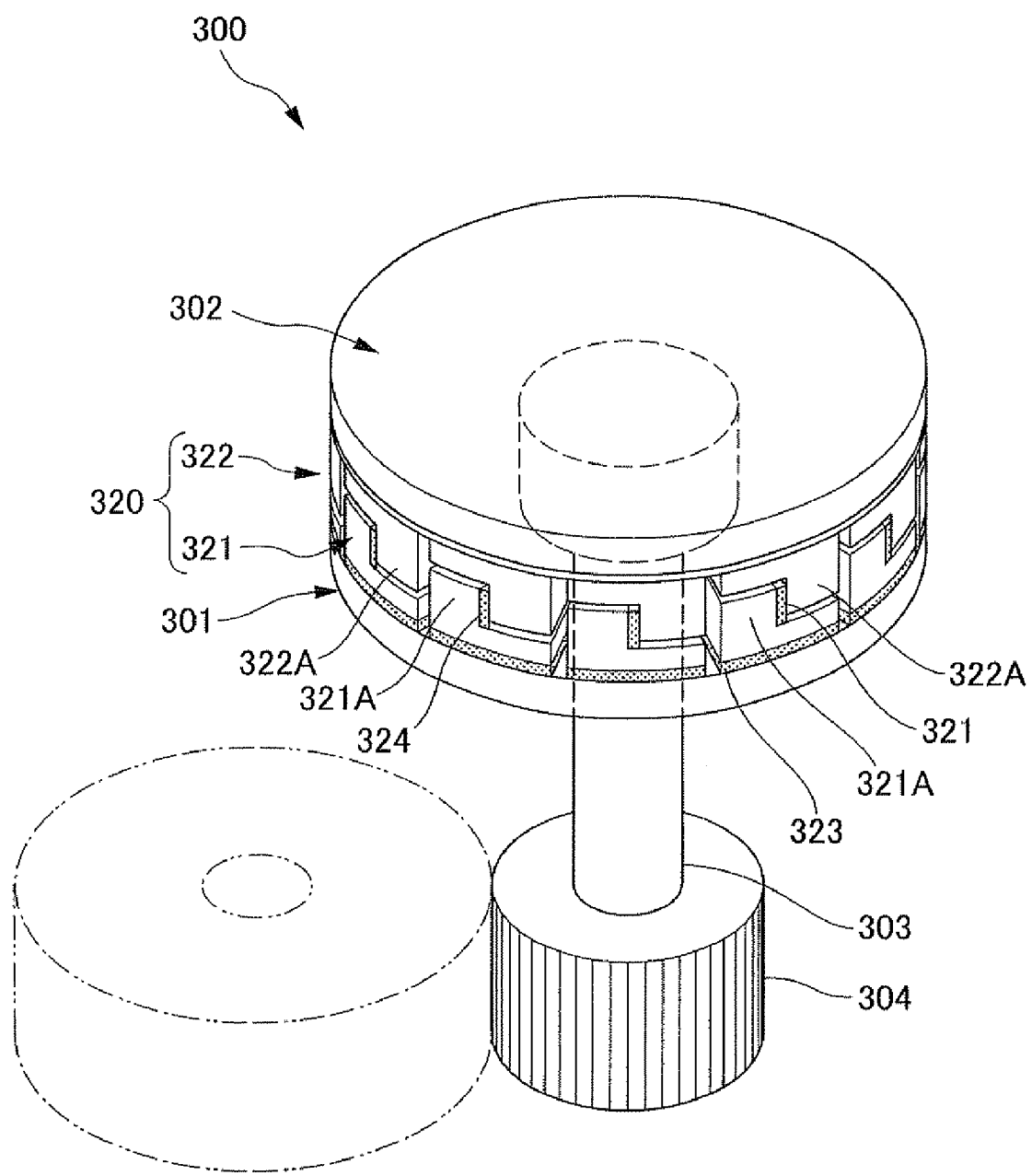
FIG. 8 is a schematic perspective view of a piezoelectric motor that is a variant example of the present invention.

(1) The above embodiments are structural examples in which the driving mechanisms 20 (and the second driving mechanisms 220) are linearly arranged, and thus the moving member 12 is operated to move linearly. However, the movement direction of the moving member 12 is not to be limited to a straight line, and may be circular. That is, a structure that performs rotation operations, by the driving mechanisms 20 being arranged in a circular ring, is possible. FIG. 8 shows a schematic perspective view of a piezoelectric motor 300 that is an example thereof.

The piezoelectric motor 300 illustrated in FIG. 8 is provided with annularly arranged driving mechanisms 320 between a stator 301 corresponding to the base member 11 of the third embodiment (see FIG. 5) and a rotor 302 corresponding to the moving member 12 (see FIG. 5).

The stator 301 is formed in an annular shape, a central portion of which is a circular aperture portion. The rotor 302 is formed substantially in a circular disc shape. A rotating shaft 303 is fixed to the rotor 302. The rotating shaft 303 passes through the aperture portion at the central portion of the stator 301, and is supported to be both movable by a predetermined amount in the axial direction and rotatable. The rotor 302 is pushingly urged to move closer to the stator 301 by unillustrated urging means. Thus, the stator 301 and the rotor 302 are made relatively rotatable with a predetermined spacing.

The rotating shaft 303 protrudes from the stator 301 to the lower side in FIG. 8, and the protruding portion thereof outputs rotary force. In FIG. 8, an output gear 304 is attached to the rotating shaft 303.

The annularly arranged driving mechanisms 320 are constituted with structures the same as the driving mechanisms 20 and 220 of the third embodiment (see FIG. 5) and plurally disposed in a circular ring arrangement. Each of the annularly arranged driving mechanisms 320 is provided with a lifter disc 321 and a slider disc 322 that is disposed to oppose the lifter disc 321.

The lifter discs 321 are attached to the stator 301 via lift driving bodies 323. Lifters 321A protrude from the upper faces of the lifter discs 321, with a predetermined spacing in the circumferential direction.

A plural number of sliders 322A protrude from faces of the slider discs 322 that oppose the lifter discs 321 (i.e., lower faces), with a predetermined spacing. Positions of arrangement of the sliders 322A correspond with locations of the spaces between the lifters 321A provided at the lifter discs 321. Between one circumferential direction side face of each slider 322A and the lifter 321A of the lifter disc 321, a slide driving body 324 is interposed. Thus, the lifter disc 321 and the slider disc 322 are connected via the slide driving body 324 to be relatively non-movable in the vertical direction. A predetermined spacing is provided between the slider disc 322 and the rotor 302 disposed thereabove at non-driving times.

In the piezoelectric motor 300 constituted as described above, the lifter discs 321 and the slider discs 322 are moved in the axial direction relative to the stator 301 by driving of the lift driving bodies 323, and the slider discs 322 abut against the rotor 302. In this state, the rotor 302 may be driven to turn about the rotating shaft 303 by driving of the slide driving bodies 324. Control of the lift driving bodies 323 and the slide driving bodies 324 is the same as in the above third embodiment.

In this structural example, the structures of the third embodiment are applied to the annularly arranged driving mechanisms 320, but clearly the structures of the first embodiment may also be applied.

(2) The numbers of the driving mechanisms 20 (and the second driving mechanisms 220) in the above embodiments are not to be limited to the numbers shown in the drawings. Obviously, greater numbers may be provided. The moving member 12 may be moved more smoothly by providing a larger number of the driving mechanisms 20 (and the second driving mechanisms 220). Furthermore, arrangements of the driving mechanisms 20 (and the second driving mechanisms 220) are not just to be single straight rows. They may be disposed in parallel rows.

Figure 9:
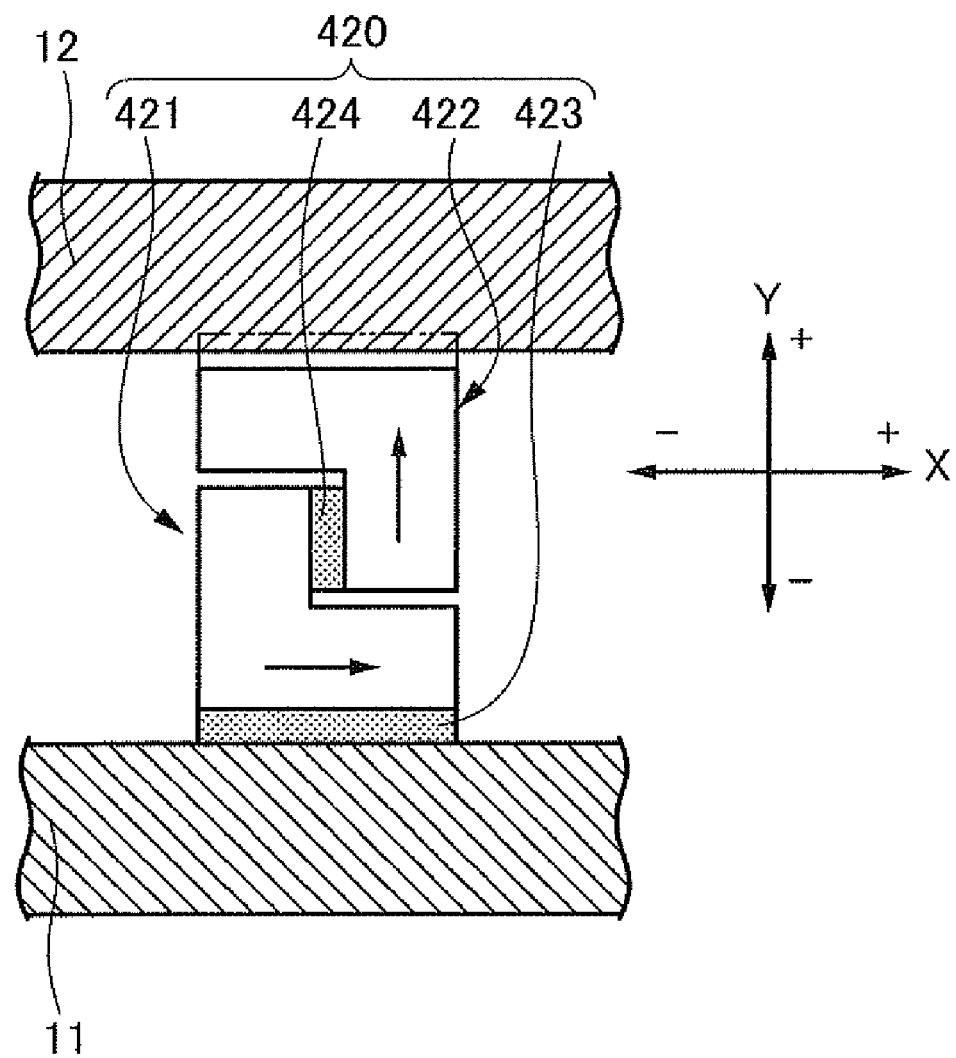
FIG. 9 is a diagram illustrating the structure of a driving mechanism of a piezoelectric actuator of a variant example of the present invention.

(3) In the above embodiments, the driving mechanisms 20 (and the second driving mechanisms 220) are constituted to drive the moving member 12 by the lift driving bodies 23 and 223 and the slide driving bodies 24 and 224 being displaced in their thickness directions (that is, by being displaced in the Y direction in FIG. 1 and FIG. 5). However, the constitution illustrated in FIG. 9 is also possible. FIG. 9 is a diagram illustrating the structure of a driving mechanism 420 according to a variant example.

In FIG. 9, a slider 421 is a member the same as the lifter 21 in FIG. 1 (or the lifter 221 in FIG. 5), and a lifter 422 is a member the same as the slider 22 in FIG. 1 (or the slider 222 in FIG. 5). A slide driving body 423 is disposed at the same position as the lift driving body 23 in FIG. 1 (or the lift driving body 223 in FIG. 5), and a lift driving body 424 is disposed at the same position as the slide driving body 24 in FIG. 1 (or the slide driving body 224 in FIG. 5), The slide driving body 423 and the lift driving body 424 are both piezoelectric elements with predetermined thicknesses that are constituted of a piezoelectric ceramic that exhibits the piezoelectric effect, or the like. The slide driving body 423 is deformed, by the application of a voltage, by a predetermined amount in a direction orthogonal to the thickness direction thereof (i.e., the X direction in FIG. 9). That is, the slide driving body 423 expands and contracts in the X direction by the voltage being turned on and off. Consequently, the slider 421 may be moved in the X direction. The lift driving body 424 is also deformed, by the application of a voltage, by a predetermined amount in a direction orthogonal to the thickness direction thereof (i.e., the Y direction in FIG. 9). That is, the lift driving body 424 expands and contracts in the Y direction by the voltage being turned on and off. Consequently, the lifter 422 may be moved in the Y direction.

The moving member 12 may be controlled to drive in the same manner as in FIG. 1 or FIG. 5 by the slide driving bodies and lift driving bodies of FIG. 9 being controlled in a similar manner to the slide driving bodies and lift driving bodies of FIG. 1 or FIG. 5.

Figure 10:
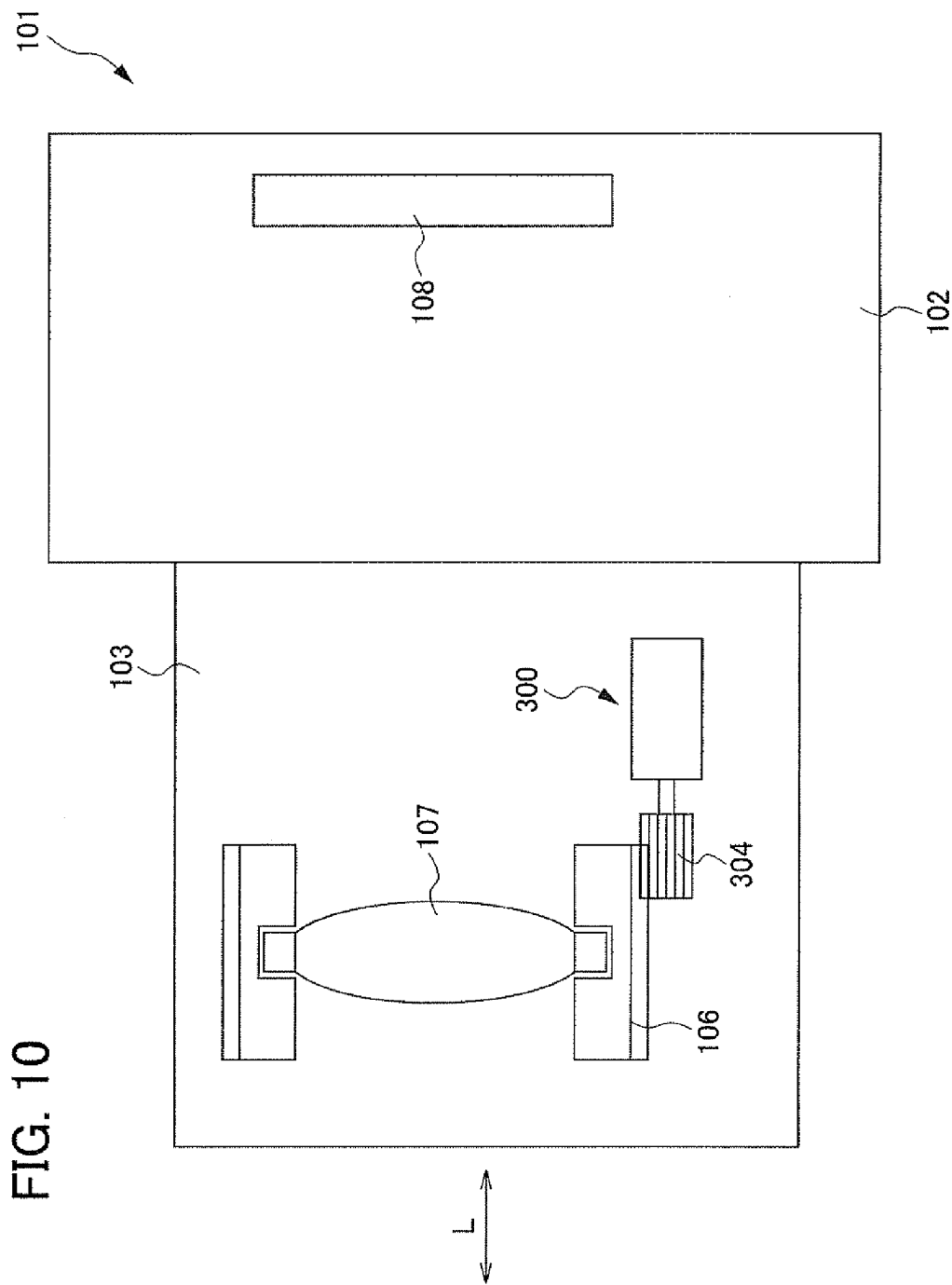
FIG. 10 is a diagram illustrating the structure of a lens barrel and camera provided with an embodiment of the piezoelectric actuator.

(4) FIG. 10 is a structural diagram of a camera 101 which is provided with the piezoelectric motor 300 that is constituted by arranging the driving mechanisms 20 (or 120, 220 or 420) in an annular arrangement as in FIG. 9. In FIG. 10, the camera 101 is provided with a camera body 102 including an imaging device 108 and a lens barrel 103 including a lens 107. The lens barrel 103 is an interchangeable lens which is detachable from the camera body 102. Although an example is illustrated in FIG. 10 in which the lens barrel 103 is an interchangeable lens, this is not to be limiting. For example, it may be a lens barrel of a type that is integral with the camera body.

The lens barrel 103 is provided with the lens 107, a cam tube 106, the gear 304, the piezoelectric motor 300 and so forth. The piezoelectric motor 300 is used as a drive source that drives the 107 during focusing operations of the camera 101. Driving force provided from the piezoelectric motor 300 is transmitted to the cam tube 106 via the gear 304. The lens 107 is retained in the cam tube 106. The lens 107 is a focusing lens that is moved substantially parallel to an optical axis direction L by the driving force of the piezoelectric motor 300 to adjust the focus.

In FIG. 10, an image of an object is focused at an imaging plane of the imaging device 108 by a lens unit (including the lens 107) provided inside the lens barrel 103. The focused object image is converted to electronic signals by the imaging device 108, and these signals are A/D-converted. Thus, image data is obtained.

The embodiments and variant examples may be suitably combined and used, but detailed descriptions are not given herein. Further, the present invention is not to be limited by the embodiments described hereabove.

What is claimed is:

1. A piezoelectric actuator comprising:
   a protruding portion that protrudes from a first face of a base member toward a moving member and is capable of supporting the moving member;
   a first piezoelectric element that is disposed along a member other than the protruding portion and that is capable of expanding and contracting in an orthogonal direction that is orthogonal to the first face; and
   a second piezoelectric element that is disposed along the member other than the protruding portion and that is capable of expanding and contracting in a direction other than the orthogonal direction
   wherein the first piezoelectric element is disposed between the first face and a first member other than the protruding portion, and the second piezoelectric element is disposed between the first member and a second member other than the first member, and
   wherein the first member includes a second face that is orthogonal to the first face, the second member includes a third face that is orthogonal to the first face, and the second piezoelectric element is disposed between the second face and the third face.

2. The piezoelectric actuator according to claim 1, wherein the first piezoelectric element and the second piezoelectric element are disposed so as not to touch each other.

3. The piezoelectric actuator according to claim 1, wherein the moving member is placed along a face of the second member at a side that is opposite from the side at which the first face is faced.

4. The piezoelectric actuator according to claim 1, further comprising
   a control section that performs control to expand and contract the first piezoelectric element and the second piezoelectric element,
   wherein the control section performs control to move the moving member in a direction of expansion and contraction of the second piezoelectric element by expanding the second piezoelectric element in a state in which the first piezoelectric element is expanded.

5. The piezoelectric actuator according to claim 4, wherein, in a state in which the first piezoelectric element and the second piezoelectric element are contracted, the moving member is supported by the protruding portion.

6. A lens barrel provided with the piezoelectric actuator according to claim 1.

7. A camera provided with the piezoelectric actuator according to claim 1.

8. A piezoelectric actuator comprising:
   a protruding portion that protrudes from a first face of a base member toward a moving member and is capable of supporting the moving member;
   a first piezoelectric element that is disposed along a member other than the protruding portion and that is capable of expanding and contracting in an orthogonal direction that is orthogonal to the first face; and
   a second piezoelectric element that is disposed along the member other than the protruding portion and that is capable of expanding and contracting in a direction other than the orthogonal direction,
   wherein the first piezoelectric element is disposed between a first member other than the protruding portion and a second member other than the first member, and the second piezoelectric element is disposed between the second member and the protruding portion, and
   wherein the moving member is placed along a face of the first member at a side that is opposite from the side at which the first face is disposed.

9. The piezoelectric actuator according to claim 8, wherein the protruding portion includes a second face that is orthogonal to the first face, the first member includes a third face that is orthogonal to the second face, and the second member includes a fourth face that is orthogonal to the first face and a fifth face that is orthogonal to the second face,
   the first piezoelectric element is disposed between the third face and the fifth face, and
   the second piezoelectric element is disposed between the second face and the fourth face.

10. A piezoelectric actuator comprising:
    a protruding portion that protrudes from a first face of a base member toward a moving member and is capable of supporting the moving member;
    a first piezoelectric element that is disposed along a member other than the protruding portion and that is capable of expanding and contracting in an orthogonal direction that is orthogonal to the first face; and
    a second piezoelectric element that is disposed along the member other than the protruding portion and that is capable of expanding and contracting in a direction other than the orthogonal direction, wherein the protruding portion includes:

a third piezoelectric element that is capable of expanding and contracting in the orthogonal direction; and a fourth piezoelectric element that is capable of expanding and contracting in a direction other than the orthogonal direction, wherein the third piezoelectric element and the fourth piezoelectric element are disposed so as not to touch each other, wherein the third piezoelectric element is disposed between the first face and a third member other than the first member and the second member, and the fourth piezoelectric element is disposed between the third member and a fourth member other than third member, and wherein the third member includes a fourth face that is orthogonal to the first face, the fourth member includes a fifth face that is orthogonal to the first face, and the fourth piezoelectric element is disposed between the fourth face and the fifth face.

11. The piezoelectric actuator according to claim 10, wherein the moving member is placed along a face of the fourth member at a side that is opposite from the side at which the first face is disposed.

12. The piezoelectric actuator according to claim 10, further comprising a control section, wherein the control section performs control to expand and contract the third piezoelectric element and the fourth piezoelectric element, and performs control to move the moving member in a direction of expansion and contraction of the fourth piezoelectric element by expanding the fourth piezoelectric element in a state in which the third piezoelectric element is expanded.

13. The piezoelectric actuator according to claim 12, wherein the moving member is supported by the second member when the first piezoelectric element is in the expanded state and the third piezoelectric element is in the contracted state, and is supported by the fourth member when the third piezoelectric element is in the expanded state and the first piezoelectric element is in the contracted state.

* * * * *